United States Patent
Cao

(10) Patent No.: US 11,528,318 B2
(45) Date of Patent: Dec. 13, 2022

(54) METHOD, APPARATUS, AND SYSTEM FOR PUSHING APPLICATION PROGRAM, AND DEVICE

(71) Applicant: Huawei Device (Shenzhen) Co., Ltd., Guangdong (CN)

(72) Inventor: Qingfeng Cao, Xi'an (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 41 days.

(21) Appl. No.: 16/125,305

(22) Filed: Sep. 7, 2018

(65) Prior Publication Data
US 2018/0367601 A1 Dec. 20, 2018

Related U.S. Application Data

(63) Continuation of application No. 15/037,285, filed as application No. PCT/CN2014/091346 on Nov. 18, 2014, now Pat. No. 10,075,506.

(30) Foreign Application Priority Data

Nov. 18, 2013 (CN) .......................... 201310581150.1

(51) Int. Cl.
*G06F 8/60* (2018.01)
*H04L 67/02* (2022.01)
(Continued)

(52) U.S. Cl.
CPC ................ *H04L 67/06* (2013.01); *G06F 8/60* (2013.01); *H04L 67/02* (2013.01); *H04L 69/329* (2013.01); *H04W 76/10* (2018.02); *G06F 9/4451* (2013.01)

(58) Field of Classification Search
CPC . H04L 67/06; H04L 69/329; H04L 29/08072; H04L 67/02; H04L 67/34;
(Continued)

(56) References Cited

U.S. PATENT DOCUMENTS 6,167,441 A * 12/2000 Himmel .............. G06F 16/9577
709/217
7,808,918 B2 10/2010 Bugenhagen
(Continued)

FOREIGN PATENT DOCUMENTS

CN 101689193 A 3/2010
CN 101800952 A 8/2010
(Continued)

OTHER PUBLICATIONS

"The Ultimate JavaScript Client Sniffer: Determining Browser Vendor, Version, and Operating System with JavaScript", https://web.archive.org/web/20130917140550/https://hea-www.harvard.edu/~fine/CFA/browser_type.html, Sep. 17, 2013, retrieved Mar. 13, 2020. (Year: 2013).*
(Continued)

*Primary Examiner* — Caroline H Jahnige
(74) *Attorney, Agent, or Firm* — Conley Rose, P.C.

(57) ABSTRACT

A method for pushing an application program includes: receiving a connection request for establishing a connection to a wireless network device that is sent by a terminal; sending a specified webpage address to the terminal, and the terminal acquires a system type of the terminal according to webpage content corresponding to the received specified webpage address and sends the system type to the wireless network device; receiving the system type sent by the terminal; and sending, to the terminal, a push address that is provided for the terminal to download an application program and is corresponding to the system type. In the present invention, when a push condition is met, a wireless network device pushes a specified application program corresponding to a system type of a terminal to the terminal.

20 Claims, 7 Drawing Sheets

(51) Int. Cl.
*H04L 67/06* (2022.01)
*H04W 76/10* (2018.01)
*H04L 69/329* (2022.01)
*G06F 9/445* (2018.01)

(58) Field of Classification Search
CPC ......... H04L 67/26; H04L 63/10; H04L 67/04;
H04L 67/42; H04L 69/22; H04L 51/046;
H04L 67/01; H04W 76/10; H04W 8/22;
G06F 8/60; G06F 9/4451; G06F 9/45529;
G06F 16/9535; G06F 16/958; G06F
16/248; G06F 3/04842; G06F 16/955;
G06F 16/986; G06F 40/134; G06F
16/9558; G06F 9/44521; G06F 8/61;
G06Q 30/0269

See application file for complete search history.

(56) References Cited

U.S. PATENT DOCUMENTS

| | | | |
|---|---|---|---|
| 8,649,768 | B1 | 2/2014 | Gaddam et al. |
| 2006/0235872 | A1 | 10/2006 | Kline et al. |
| 2006/0271662 | A1 | 11/2006 | Fritsch et al. |
| 2007/0011292 | A1 | 1/2007 | Fritsch et al. |
| 2007/0106984 | A1* | 5/2007 | Birk Olsen ............... G06F 8/61 717/174 |
| 2008/0235680 | A1 | 9/2008 | Strauss et al. |
| 2008/0242284 | A1* | 10/2008 | Vechey ............. H04M 1/72427 455/415 |
| 2010/0088367 | A1* | 4/2010 | Brown .................... H04L 67/04 709/203 |
| 2010/0180192 | A1* | 7/2010 | Hall .................... G06F 16/9577 715/234 |
| 2010/0205274 | A1* | 8/2010 | Gharabally ............... G06F 8/61 709/217 |
| 2010/0325194 | A1 | 12/2010 | Williamson et al. |
| 2012/0047011 | A1 | 2/2012 | Rippetoe et al. |
| 2012/0131206 | A1 | 5/2012 | Shunji |
| 2012/0246291 | A1* | 9/2012 | Wong ........................ G06F 8/61 709/224 |
| 2013/0124606 | A1 | 5/2013 | Carpenter et al. |
| 2013/0152068 | A1 | 6/2013 | Crk et al. |
| 2013/0246356 | A1 | 9/2013 | Taylor et al. |
| 2013/0247147 | A1 | 9/2013 | Pontillo et al. |
| 2014/0095583 | A1* | 4/2014 | Houle ................ G06F 16/9577 709/203 |
| 2014/0172911 | A1* | 6/2014 | Cohen .................... G06F 9/445 707/770 |
| 2014/0173415 | A1* | 6/2014 | Kattil Cherian ...... H04L 41/069 715/234 |
| 2014/0379800 | A1* | 12/2014 | Li .......................... H04L 67/34 709/204 |
| 2016/0057989 | A1* | 3/2016 | Vilinskis ................ G06Q 10/10 340/539.13 |
| 2016/0321718 | A1 | 11/2016 | Wong et al. |
| 2017/0206514 | A9 | 7/2017 | Jeon et al. |

FOREIGN PATENT DOCUMENTS

| | | |
|---|---|---|
| CN | 101848230 A | 9/2010 |
| CN | 102595407 A | 7/2012 |
| CN | 102693495 A | 9/2012 |
| CN | 102761554 A | 10/2012 |
| CN | 102970348 A | 3/2013 |
| CN | 103024727 A | 4/2013 |
| CN | 103176825 A | 6/2013 |
| CN | 103347258 A | 10/2013 |
| CN | 103685482 A | 3/2014 |
| JP | 2001304874 A | 10/2001 |
| JP | 2002229898 A | 8/2002 |
| JP | 2007149052 A | 6/2007 |
| JP | 2009-141420 A | 6/2009 |
| JP | 2010169619 A | 8/2010 |

OTHER PUBLICATIONS

Lim, S., "Investigating App Store Ranking Algorithms using a Simulation of Mobile App Ecosystems," 2013 IEEE Congress on Evolutionary Computation, Jun. 20-23, 2013, 8 pages.

\* cited by examiner

METHOD, APPARATUS, AND SYSTEM FOR PUSHING APPLICATION PROGRAM, AND DEVICE

CROSS-REFERENCE TO RELATED APPLICATIONS

This application is a continuation of U.S. patent application Ser. No. 15/037,285 filed on May 17, 2016, which is a U.S. national stage of International Application No. PCT/CN2014/091346 filed on Nov. 18, 2014, which claims priority to Chinese Patent Application No. 201310581150.1 filed on Nov. 18, 2013. All of the afore-mentioned patent applications are hereby incorporated by reference in their entireties.

TECHNICAL FIELD

The present invention relates to the field of computer technologies, and in particular, to a method, apparatus, and system for pushing an application program, and a device.

BACKGROUND

With the continuous promotion and application of application programs, an application store provides application programs with increasingly abundant functions for terminals.

In general, when a user wants to download an application program for a possessed terminal, the user first needs to enter an application store by using the terminal, and then searches, in the application store, for an application program that needs to be downloaded and is corresponding to a system type of the terminal.

In a process of implementing the present invention, the inventors find that at least the following problem exists in the prior art: To acquire an application program, the user has to actively enter the application store by using the terminal, and when the user does not enter the application store for a long time, the user cannot learn a latest added application program in the application store. Consequently, the user is likely to miss a best opportunity to obtain a new application program.

SUMMARY

To resolve a problem in the prior art that a user is likely to miss a best opportunity to obtain a new application program, embodiments of the present invention provide a method, apparatus, system for pushing an application program, and a device. The technical solutions are as follows:

According to a first aspect, a method for pushing an application program is provided, where the method is applied to a wireless network device and includes:

receiving a connection request for establishing a connection to the wireless network device that is sent by a terminal;

sending a specified webpage address to the terminal, and the terminal acquires a system type of the terminal according to webpage content corresponding to the received specified webpage address and sends the system type to the wireless network device;

receiving the system type sent by the terminal; and sending, to the terminal, a push address that is provided for the terminal to download an application program and is corresponding to the system type.

In a first possible implementation manner of the first aspect, the sending, to the terminal, a push address that is provided for the terminal to download an application program and is corresponding to the system type includes:

when one application program is to be pushed, sending, to the terminal, a download address that is required when the terminal downloads the application program and that is corresponding to the system type; and when two or more application programs are to be pushed, sending, to the terminal, a webpage address of a recommended webpage corresponding to the system type, where the recommended webpage includes download addresses of all to-be-pushed application programs.

With reference to the first aspect or the first possible implementation manner of the first aspect, in a second possible implementation manner, after the sending, to the terminal, a webpage address of a recommended webpage corresponding to the system type, the method further includes:

receiving a loading request that is sent when the terminal loads content of the recommended webpage;

checking whether a notification message that is sent by the terminal and is used to indicate that the terminal has installed a specified application program is received; and if a check result is that the notification message that is sent by the terminal and is used to indicate that the terminal has installed the specified application program is received, sending, to the terminal, an instruction of not loading a download address of the specified application program, and the terminal displays a page of a recommended webpage that includes download addresses of all other to-be-pushed application programs than the specified application program.

With reference to the first aspect, the first possible implementation manner of the first aspect, or the second possible implementation manner of the first aspect, in a third possible implementation manner, after the receiving a connection request for establishing a connection to the wireless network device that is sent by a terminal, the method further includes:

checking whether the wireless network device stores a refuse instruction that is sent by the terminal and is used to indicate that the terminal refuses to receive an application program pushed by the wireless network device; and if a check result is that the wireless network device does not store the refuse instruction that is sent by the terminal and is used to indicate that the terminal refuses to receive the application program pushed by the wireless network device, executing the step of sending a specified webpage address to the terminal.

According to a second aspect, an apparatus for pushing an application program is provided, where the apparatus is applied to a wireless network device and includes:

a first receiving module, configured to control a receiver to receive a connection request for establishing a connection to the wireless network device that is sent by a terminal;

a first sending module, configured to: control a transmitter to send a specified webpage address to the terminal, and the terminal acquires a system type of the terminal according to webpage content corresponding to the received specified webpage address and sends the system type to the wireless network device;

a second receiving module, configured to control the receiver to receive the system type sent by the terminal; and a second sending module, configured to control the transmitter to send, to the terminal, a push address that is provided for the terminal to download an application program and is corresponding to the system type.

In a first possible implementation manner of the second aspect, the second sending module includes:

a first sending unit, configured to: when one application program is to be pushed, control the transmitter to send, to the terminal, a download address that is required when the terminal downloads the application program and that is corresponding to the system type; and a second sending unit, configured to: when two or more application programs are to be pushed, control the transmitter to send, to the terminal, a webpage address of a recommended webpage corresponding to the system type, where the recommended webpage includes download addresses of all to-be-pushed application programs.

With reference to the second aspect or the first possible implementation manner of the second aspect, in a second possible implementation manner, the apparatus further includes:

a third receiving module, configured to control the receiver to receive a loading request that is sent when the terminal loads content of the recommended webpage;

a first checking module, configured to control a processor to check whether a notification message that is sent by the terminal and is used to indicate that the terminal has installed a specified application program is received; and a third sending module, configured to: when a check result of the first checking module is that the notification message that is sent by the terminal and is used to indicate that the terminal has installed the specified application program is received, control the transmitter to send, to the terminal, an instruction of not loading a download address of the specified application program, and the terminal displays a page of a recommended webpage that includes download addresses of all other to-be-pushed application programs than the specified application program.

With reference to the second aspect, the first possible implementation manner of the second aspect, or the second possible implementation manner of the second aspect, in a third possible implementation manner, the apparatus further includes:

a second checking module, configured to control the processor to check whether the wireless network device stores a refuse instruction that is sent by the terminal and is used to indicate that the terminal refuses to receive an application program pushed by the wireless network device; where the first sending module is further configured to: when a check result of the second checking module is that the wireless network device does not store the refuse instruction that is sent by the terminal and is used to indicate that the terminal refuses to receive the application program pushed by the wireless network device, control the transmitter to send the specified webpage address to the terminal.

According to a third aspect, a wireless network device is provided, where the wireless network device includes a receiver and a transmitter; where the receiver is configured to receive a connection request for establishing a connection to the wireless network device that is sent by a terminal;

the transmitter is configured to send a specified webpage address to the terminal, and the terminal acquires a system type of the terminal according to webpage content corresponding to the received specified webpage address and sends the system type to the wireless network device;

the receiver is configured to receive the system type sent by the terminal; and the transmitter is configured to send, to the terminal, a push address that is provided for the terminal to download an application program and is corresponding to the system type.

In a first possible implementation manner of the third aspect, the transmitter is further configured to: when one application program is to be pushed, send, to the terminal, a download address that is required when the terminal downloads the application program and is corresponding to the system type; and the transmitter is further configured to: when two or more application programs are to be pushed, send, to the terminal, a webpage address of a recommended webpage corresponding to the system type, where the recommended webpage includes download addresses of all to-be-pushed application programs.

With reference to the third aspect or the first possible implementation manner of the third aspect, in a second possible implementation manner, the apparatus further includes a processor; where the receiver is further configured to receive a loading request that is sent when the terminal loads content of the recommended webpage;

the processor is configured to check whether a notification message that is sent by the terminal and is used to indicate that the terminal has installed a specified application program is received; and the transmitter is configured to: when a check result of the processor is that the notification message that is sent by the terminal and is used to indicate that the terminal has installed the specified application program is received, send, to the terminal, an instruction of not loading a download address of the specified application program, and the terminal displays a page of a recommended webpage that includes download addresses of all other to-be-pushed application programs than the specified application program.

With reference to the third aspect, the first possible implementation manner of the third aspect, or the second possible implementation manner of the third aspect, in a third possible implementation manner, the processor is further configured to check whether the wireless network device stores a refuse instruction that is sent by the terminal and is used to indicate that the terminal refuses to receive an application program pushed by the wireless network device; and the transmitter is further configured to: when a check result of the processor is that the wireless network device does not store the refuse instruction that is sent by the terminal and is used to indicate that the terminal refuses to receive the application program pushed by the wireless network device, control the transmitter to send the specified webpage address to the terminal.

According to a fourth aspect, a wireless network device is further provided, where the wireless network device includes the apparatus for pushing an application program described in the second aspect and in each implementation manner of the second aspect, or the wireless network device described in the third aspect.

According to a fifth aspect, a system for pushing an application program is further provided, where the system includes a wireless network device and at least one terminal, where the wireless network device is connected to the terminal by using a wired network or by using a wireless network; and the wireless network device is the wireless network device described in the fourth aspect.

The technical solutions provided in the embodiments of the present invention bring the following beneficial effects:

A wireless network device sends webpage content of a set webpage in the wireless network device to a terminal, the terminal acquires a system type of the terminal according to the webpage content, and the wireless network device sends, to the terminal, a push address that is provided for the terminal to download an application program and is corresponding to the system type, which resolves a problem in the prior art that a user is likely to miss a best opportunity to obtain a new application program. When a specified application program is developed and needs to be pushed, multiple download addresses, corresponding to the system type, of the to-be-pushed application program may be added to the wireless network device, and when the system type of the terminal is acquired, a push address that is provided for the terminal to download the application program and is corresponding to the system type may be sent to the terminal, which implements a function of actively pushing the specified application program to the terminal, and achieves an effect of ensuring that the user can grasp the best opportunity to obtain the new application program.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

Figure 1:
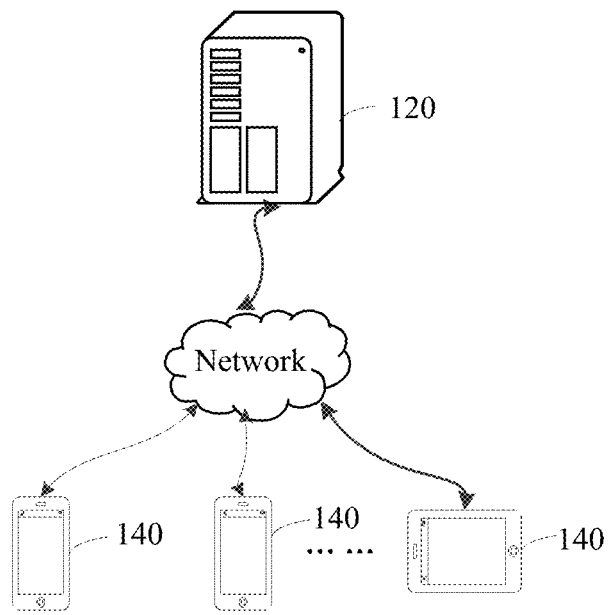
FIG. 1 is a schematic diagram of an implementation environment related to a method for pushing an application program according to a part of embodiments of the present invention.

Referring to FIG. 1, FIG. 1 shows a schematic diagram of an implementation environment related to a method for pushing an application program according to a part of embodiments of the present invention. The implementation environment may include: a wireless network device 120 and at least one terminal 140.

The wireless network device 120 may communicate with an external device by using a wired network or by using a wireless network, where the wireless network device 120 here may be a wireless router or the like.

The terminal 140 may be connected to the wireless network device 120 by using a wired network or by using a wireless network, and acquires data of an external network by using the wireless network device 120. The terminal 140 may be an electronic device on which a browser runs, where the electronic device may be a smart phone, a tablet computer, a smart television set, an eBook reader, an MP3 player (Moving Picture Experts Group Audio Layer III, Moving Picture Experts Group Audio Layer 3), an MP4 (Moving Picture Experts Group Audio Layer IV, Moving Picture Experts Group Audio Layer 4) player, a laptop computer, a desktop computer or the like.

Figure 2:
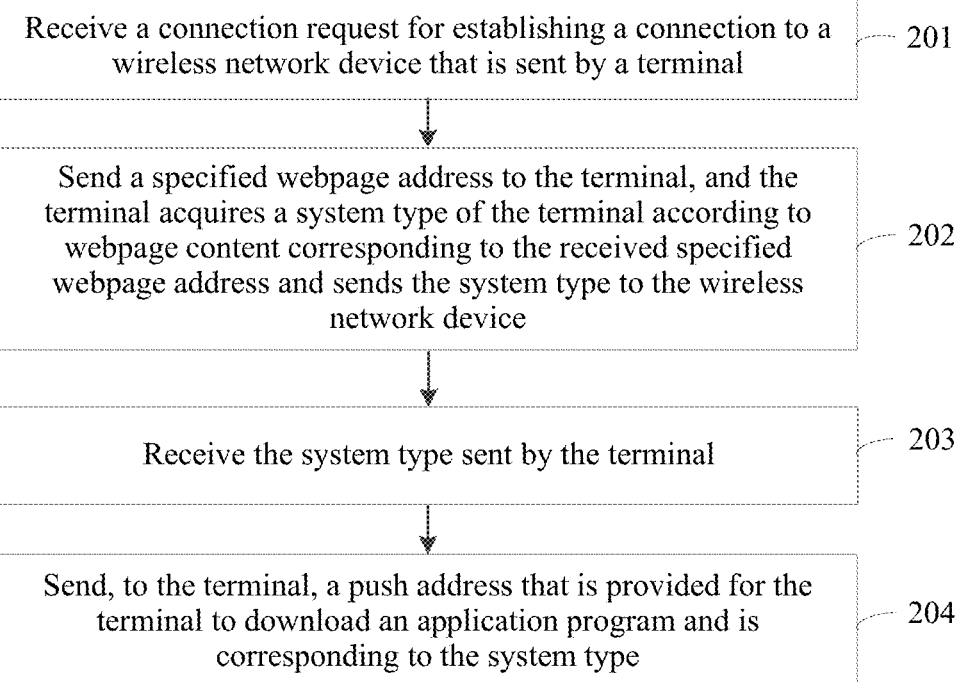
FIG. 2 is a method flowchart of a method for pushing an application program according to an embodiment of the present invention.

Referring to FIG. 2, FIG. 2 shows a method flowchart of a method for pushing an application program according to an embodiment of the present invention. In this embodiment, that the method for pushing an application program is applied to the wireless network device 120 shown in FIG. 1 is used as an example for description. The method for pushing an application program may include:

201. Receive a connection request for establishing a connection to the wireless network device that is sent by a terminal.

Generally, when the terminal needs to establish a network connection to the wireless network device, the terminal generally sends, to the wireless network device, a connection request for establishing the connection. Accordingly, the wireless network device may receive the connection request for establishing a connection to the wireless network device that is sent by the terminal. The connection request may be a request message, or may be a webpage address.

202. Send a specified webpage address to the terminal, and the terminal acquires a system type of the terminal according to webpage content corresponding to the received specified webpage address and sends the system type to the wireless network device.

After the wireless network device receives the connection request sent by the terminal, if an application program needs to be pushed to the terminal, the terminal may be redirected, that is, the specified webpage address is sent to the terminal. The specified webpage address is generally an address of a set webpage in the wireless network device. A homepage address of a set webpage in an existing wireless network device may be http://192.168.1.1/html/index.html by default. Generally, the set webpage in the wireless network device may be a webpage used to set the wireless network device, for example, setting whether the wireless network device enables a wireless function, setting a login user and a login password of the wireless network device, and setting a function of a firewall in the wireless network device.

In practical application, installation packages of application programs corresponding to different system types are different. Therefore, when an application program is pushed to the terminal, the system type of the terminal generally needs to be acquired first. The set webpage generally includes a running script for acquiring a system type of a terminal. When the wireless network device needs to push an application program to the terminal, the webpage address of the set webpage may be sent to the terminal and a browser of the terminal loads the running script of the set webpage. The running script may automatically acquire the system type of the terminal, and send the system type to the wireless network device.

203. Receive the system type sent by the terminal.

Accordingly, the wireless network device may receive the system type sent by the terminal.

204. Send, to the terminal, a push address that is provided for the terminal to download an application program and is corresponding to the system type.

The wireless network device sends the push address of the to-be-pushed application program to the terminal, where the push address is corresponding to the system type of the terminal.

For example, when the push address of the to-be-pushed application program includes a download address, corresponding to a MuNi system, of the application program and a download address, corresponding to an audio system, of the application program, and when the acquired system type of the terminal is the MuNi system, the download address, corresponding to the MuNi system, of the application program is sent to the terminal.

In conclusion, according to the method for pushing an application program provided in this embodiment of the present invention, a system type of a terminal is acquired, and a download address that is provided for the terminal to download an application program and is corresponding to the system type is actively sent to the terminal, which resolves a problem in the prior art that a user is likely to miss a best opportunity to obtain a new application program. When an application program is developed and needs to be pushed, a link address of a download page of the to-be-pushed specified application program may be added to webpage content of a set webpage in a wireless network device in advance, and the wireless network device may push the link address to the terminal after acquiring the system type of the terminal, which implements a function of actively pushing the specified application program to the terminal, and achieves an effect of ensuring that the user can grasp the best opportunity to obtain the new application program.

Figure 3A:
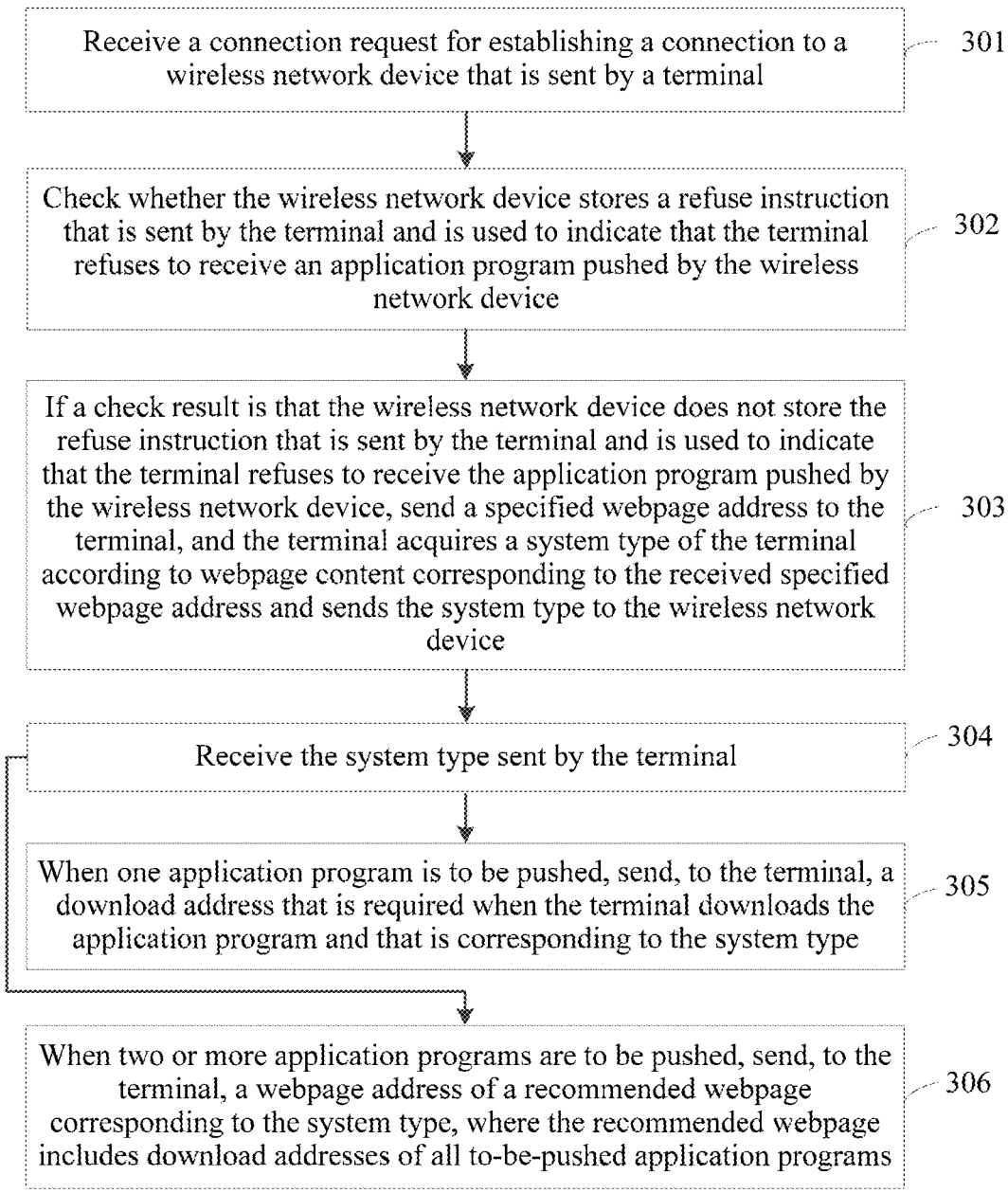
FIG. 3A is a method flowchart of a method for pushing an application program according to another embodiment of the present invention.

Referring to FIG. 3A, FIG. 3A shows a method flowchart of a method for pushing an application program according to an embodiment of the present invention. In this embodiment, that the method for pushing an application program is applied to the wireless network device 120 shown in FIG. 1 is used as an example for description. The method for pushing an application program may include:

301. Receive a connection request for establishing a connection to the wireless network device that is sent by a terminal.

Generally, when the terminal needs to establish a network connection to the wireless network device, the terminal generally sends, to the wireless network device, a connection request for establishing the connection. Accordingly, the wireless network device may receive the connection request for establishing a connection to the wireless network device that is sent by the terminal.

302. Check whether the wireless network device stores a refuse instruction that is sent by the terminal and is used to indicate that the terminal refuses to receive an application program pushed by the wireless network device.

In practical application, to improve friendliness to the terminal, after the terminal receives push information sent by the wireless network device for the first time, if the terminal does not want to continue to receive the push information sent by the wireless network device, a selection button that is set in the push information and is used to indicate that push is no longer received may be selected, so as to send, to the wireless network device, the refuse instruction used to indicate that the terminal refuses to receive the application program pushed by the wireless network device.

Accordingly, after receiving the connection request sent by the terminal, the wireless network device checks whether the wireless network device stores the refuse instruction sent by the terminal. If the wireless network device stores the refuse instruction sent by the terminal, a push operation is no longer continued, but page content related to the connection request is normally acquired from a server and is sent to the terminal; if the wireless network device does not receive the refuse instruction that is sent by the terminal and is used to indicate that the terminal refuses to receive the application program pushed by the wireless network device, step 303 is executed.

303. If a check result is that the wireless network device does not store the refuse instruction that is sent by the terminal and is used to indicate that the terminal refuses to receive the application program pushed by the wireless network device, send a specified webpage address to the terminal, and the terminal acquires a system type of the terminal according to webpage content corresponding to the received specified webpage address and sends the system type to the wireless network device.

The specified webpage address is a webpage address of a set webpage in the wireless network device. In practical application, the set webpage in the wireless network device may be a webpage WebUI used to set the wireless network device, for example, setting whether the wireless network device enables a wireless function, setting a login user and a login password of the wireless network device, and setting a function of a firewall in the wireless network device.

Generally, the terminal may log in to the set webpage of the wireless network device by using a browser set in the terminal. A default address of a set webpage WebUI in an existing wireless network device may be http://192.168.1.1/. After a user enters the default address in an address bar of the browser of the terminal, the user may set related content of the set webpage in the wireless network device connected to the terminal.

Here, the specified webpage address sent by the wireless network device to the terminal may be set to a homepage address of the set webpage WebUI by default, for example, http://192.168.1.1/html/index.html.

The webpage content of the set webpage in the wireless network device may include a running script Javascript, a display frame HTML, and an element display mode CSS. The running script is set by the wireless network device according to a specific function. For example, the script may be used to display the webpage content, may be used to acquire the system type of the terminal, may be used to send the system type to the wireless network device, may be used to jump to a link address, and the like.

After acquiring the specified webpage address of the set webpage redirected to by the wireless network device, the terminal loads the content of the set webpage. In this case, the running script in the set webpage may acquire the system type of the terminal according to an interface, in the browser, for acquiring a system type, and then the running script sends the system type to the wireless network device.

Generally, the interface for acquiring a system type of a terminal is generally set by default in a browser installed in the terminal. A type acquisition script may call the interface, in the browser, for acquiring a system type of a terminal, so as to acquire the system type of the terminal.

In a possible implementation manner, when the terminal has dual systems, a system type acquired according to the type acquisition script is a type of a system in which a browser is currently opened. For example, the terminal may include a MuNi system and an andio system. In this case, if a browser in the MuNi system is opened, a system type that is acquired by using a type acquisition script in webpage content acquired by the browser is the MuNi system.

304. Receive the system type sent by the terminal.

The wireless network device receives the system type sent by the running script in the terminal.

305. When one application program is to be pushed, send, to the terminal, a download address that is required when the terminal downloads the application program and that is corresponding to the system type.

When the wireless network device only needs to push one application program, the wireless network device stores a download address of the application program, where the download address of the application program is provided by a developer and may include multiple download addresses corresponding to different system types. After acquiring the system type of the terminal, the wireless network device may push, to the terminal, a download address, corresponding to the system type, of the application program.

For example, the wireless network device stores a first download address and a second download address of an application program A, where a download page corresponding to the first download address includes an installation package that may be used in the MuNi system, and a download page corresponding to the second download address includes an installation package that may be used in the andio system. When the system type that is sent by the terminal and is received by the wireless network device is the MuNi system, the wireless network device pushes the first download address to the terminal; when the system type that is sent by the terminal and is received by the wireless network device is the andio system, the wireless network device pushes the second download address to the terminal.

Accordingly, after acquiring the download address, the terminal may load a download page corresponding to the download address, where the download page includes an installation package of the application program that may be installed in the terminal, and the terminal user may select whether to download the installation package.

306. When two or more application programs are to be pushed, send, to the terminal, a webpage address of a recommended webpage corresponding to the system type, where the recommended webpage includes download addresses of all to-be-pushed application programs.

When two or more application programs are to be pushed by the wireless network device to the terminal, the webpage address of the recommended webpage that includes a download address of each application program may be pushed to the terminal, that is, the recommended webpage includes download addresses of two or more application programs, and these download addresses are all corresponding to a same system type.

For example, there may be a webpage address of a recommended webpage 1 and a webpage address of a recommended webpage 2 in the wireless network device, where the recommended webpage 1 corresponding to a system 1 may include a download address a1 of an application program A and a download address b1 of an application program B, and the recommended webpage 2 corresponding to a system 2 may include a download address a2 of the application program A and a download address b2 of the application program B. When determining that the system type of the terminal is the system 1, the wireless network device sends the webpage address of the recommended webpage 1 to the terminal; when determining that the system type of the terminal is the system 2, the wireless network device sends the webpage address of recommended webpage 2 to the terminal.

In a possible implementation manner, after receiving the webpage address of the recommended webpage, the terminal loads the recommended webpage. In this case, the running script may send a loading request to the wireless network device, so as to confirm with the wireless network device a download address of an application program that needs to be loaded. Accordingly, the wireless network device receives the loading request that is sent when the terminal loads content of the recommended webpage; the wireless network device checks whether a notification message that is sent by the terminal and is used to indicate that the terminal has installed a specified application program is received; and if a check result is that the notification message that is sent by the terminal and is used to indicate that the terminal has installed the specified application program is received, the wireless network device sends, to the terminal, an instruction of not loading a download address of the specified application program, and the terminal displays a page of a recommended webpage that includes download addresses of all other to-be-pushed application programs than the specified application program. That is, when the terminal has installed one or more application programs that the wireless network device needs to push, these application programs may send, to the wireless network device, a notification message indicating that an application program has been installed in the terminal. After acquiring the notification message, the wireless network device determines whether the application program is the same as the to-be-pushed application program. If the application program is the same as the to-be-pushed application program, the wireless network device does not push the application program to the terminal any longer, but only pushes another application program to the terminal.

In conclusion, according to the method for pushing an application program provided in this embodiment of the present invention, a system type of a terminal is acquired, and a download address that is provided for the terminal to download an application program and is corresponding to the system type is actively sent to the terminal, which resolves a problem in the prior art that a user is likely to miss a best opportunity to obtain a new application program. When an application program is developed and needs to be pushed, a link address of a download page of the to-be-pushed specified application program may be added to webpage content of a set webpage in a wireless network device in advance, and the wireless network device may push the link address to the terminal after acquiring the system type of the terminal, which implements a function of actively pushing the specified application program to the terminal, and achieves an effect of ensuring that the user can grasp the best opportunity to obtain the new application program.

It should be noted that because the wireless network device may randomly set the running script of the foregoing set webpage. For example, the running script may be set to directly jump to the download page of the to-be-pushed application program according to the system type after the system type is acquired. For another example, the running script may be set to directly display, after the system type is acquired and on a page of a browser, download addresses that are of multiple application programs pushed by the wireless network device and are corresponding to the system type. When the user selects a download address of one application program thereof, the running script jumps to the download page of the download address. That is, in practical application, functions of the running script may be all set in advance, and the wireless network device may no longer be queried when the download page of the to-be-pushed application program or a recommended webpage that includes a fast navigation option is displayed.

For example, when the wireless network device needs to push multiple application programs to the terminal, if the running script of the set webpage acquires the system type, the running script may further execute the following steps:

First, display a shortcut navigation option of the download page of the specified application program corresponding to the system type.

Figure 3B:
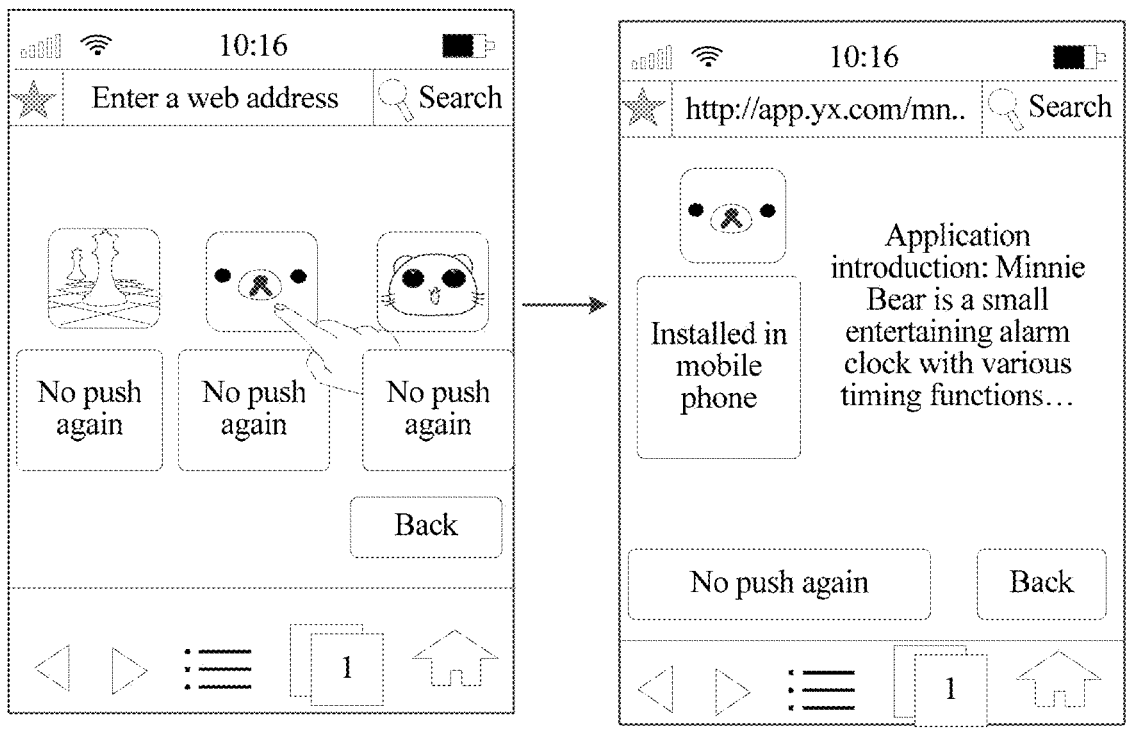
FIG. 3B is a schematic diagram of a shortcut navigation option according to a part of embodiments of the present invention.
Figure 3C:
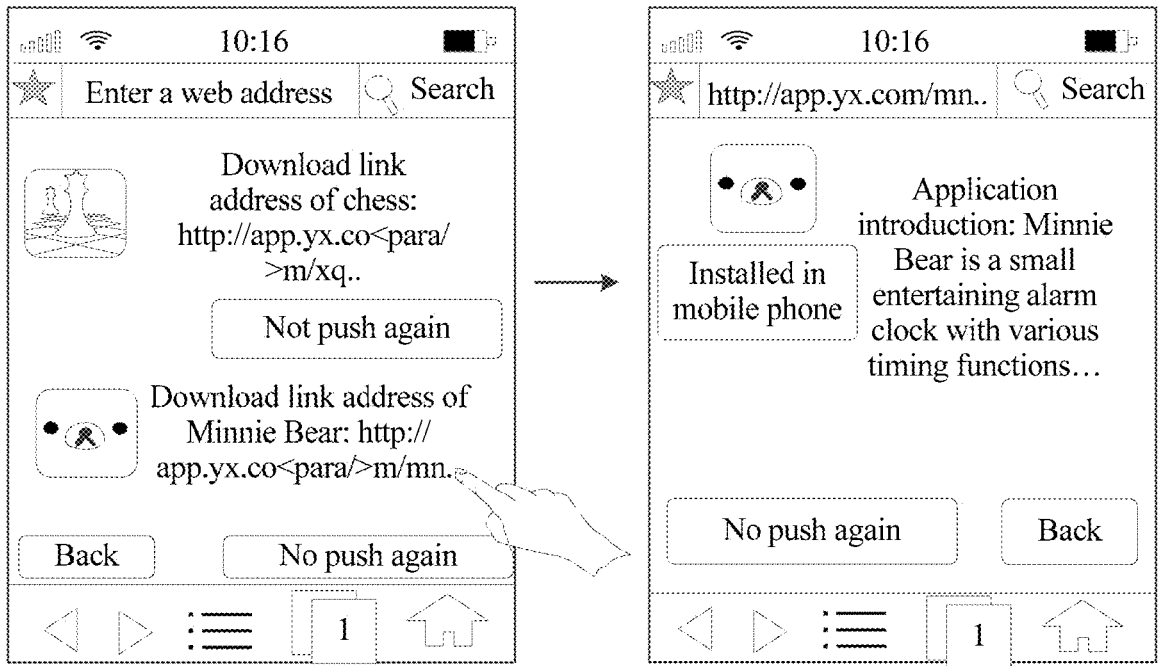
FIG. 3C is a schematic diagram of a shortcut navigation option according to another part of embodiments of the present invention.

A function of displaying the shortcut navigation option of the download page of the specified application program corresponding to the system type is set by the wireless network device in advance. The shortcut navigation option mentioned here is corresponding to the link address of the download page. For example, the shortcut navigation option may be an application program icon set in a page of a webpage in a browser. The application program icon is correlated with a link address of a corresponding download page, for example, a shortcut navigation option shown in FIG. 3B. FIG. 3B is a schematic diagram of a shortcut navigation option according to a part of embodiments. For another example, the shortcut navigation option may further be a link address set in a page of a webpage in a browser. The link address is a webpage address of a download page of an application program, for example, a shortcut navigation option shown in FIG. 3C. FIG. 3C is a schematic diagram of a shortcut navigation option according to another part of embodiments.

Generally, the terminal may display these shortcut navigation options by using an already opened browser, and specific content and a presentation form of a page that displays the shortcut navigation option are implemented by HTML and CSS in a WebUI.

Afterwards, after a determining request that is generated when the user selects one shortcut navigation option thereof is received, a download page corresponding to the shortcut navigation option corresponding to the determining request is displayed.

When the user selects one shortcut navigation option thereof, accordingly, the terminal may receive the determining request that is generated when the user selects the shortcut navigation option. In this case, according to the functions set for the running script by the wireless network device in advance, the running script may directly display the download page corresponding to the shortcut navigation option corresponding to the determining request.

After receiving the determining request, the terminal displays the download page corresponding to the shortcut navigation option corresponding to the determining request, that is, a browser in the terminal jumps to the download page corresponding to the shortcut navigation option corresponding to the determining request.

For example, still referring to FIG. 3B, when the user selects a shortcut navigation option of "Minnie bear alarm clock", the browser of the terminal jumps to a download page corresponding to "Minnie bear alarm clock".

For another example, referring to FIG. 3C, when the user selects a link address whose URL is "Minnie bear alarm clock", that is: http://app.yx.com/mn . . . , the browser of the terminal displays the download page corresponding to "Minnie bear alarm clock".

Here, it should be noted that content in FIG. 3B and FIG. 3C is only an exemplary example. Display of the shortcut navigation option and corresponding text description, a property of the shortcut navigation option and a property of a text are all determined by the HTML and the CSS in the WebUI. Therefore, content related to the shortcut navigation option may be displayed according to an actual need.

Figure 4A:
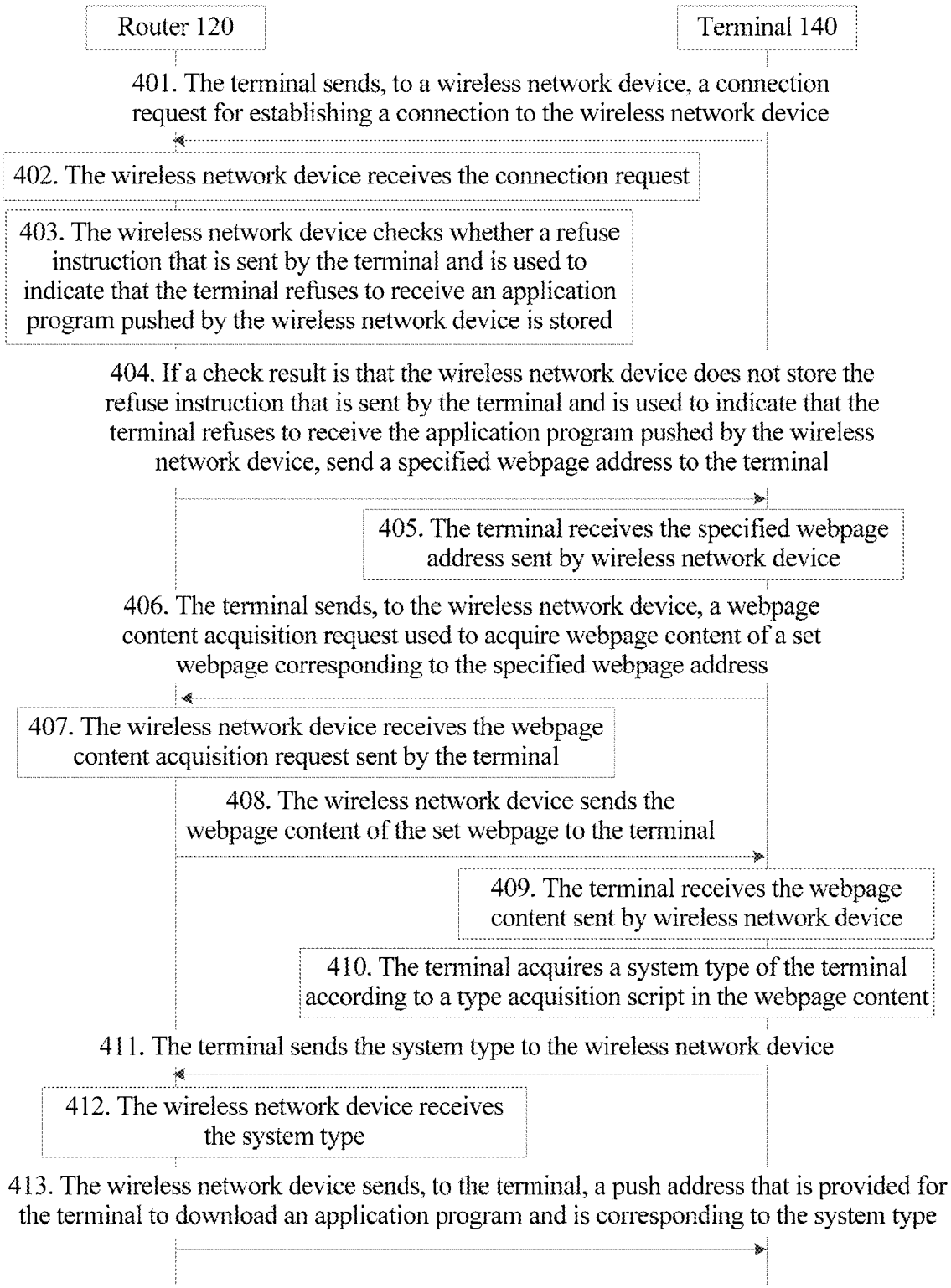
FIG. 4A is a method flowchart of a method for pushing an application program according to still another embodiment of the present invention.

To more clearly learn a process in which the terminal and the wireless network device complete pushing the specified application program, reference may be made to description in FIG. 4A.

Referring to FIG. 4A, FIG. 4A shows a method flowchart of still another method for pushing an application program according to the present invention. In this embodiment, that the method for pushing an application program is applied to the implementation environment shown in FIG. 1 is used as an example for description. The method for pushing an application program may include:

401. A terminal sends, to a wireless network device, a connection request for establishing a connection to the wireless network device.

Figure 4B:
FIG. 4B is a schematic diagram when a wireless network device redirects a terminal for a first time according to an embodiment of the present invention.

For example, referring to FIG. 4B, FIG. 4B shows a schematic diagram when a wireless network device redirects a terminal for the first time according to an embodiment of the present invention. A mobile phone browser (that is, the terminal) sends the connection request to the wireless network device, where the connection request includes a random URL=www.yx.com (the webpage address is only an exemplary example). After receiving the connection request, the wireless network device redirects a link address of the terminal to a webpage address of a set webpage in the wireless network device (that is, an address of a WebUI). The webpage address may be: URL=192.168.1.1/html/index.html.

402. The wireless network device receives the connection request.

403. The wireless network device checks whether a refuse instruction that is sent by the terminal and is used to indicate that the terminal refuses to receive an application program pushed by the wireless network device is stored.

404. If a check result is that the wireless network device does not store the refuse instruction that is sent by the terminal and is used to indicate that the terminal refuses to receive the application program pushed by the wireless network device, send a specified webpage address to the terminal.

For example, when the terminal has permission to change settings of the wireless network device, the terminal may select to refuse some or all specified application programs pushed by the wireless network device to the terminal. Accordingly, after verifying an identity of a user, the wireless network device no longer pushes, to the terminal, a specified application program refused by the terminal.

The specified webpage address mentioned here is the webpage address of the set webpage in the wireless network device, where the set webpage is a webpage used to set the wireless network device, which is described in detail in the foregoing embodiments and is not described in detail herein again to avoid redundancy.

405. The terminal receives the specified webpage address sent by wireless network device.

406. The terminal sends, to the wireless network device, a webpage content acquisition request used to acquire webpage content of a set webpage corresponding to the specified webpage address.

The webpage content mentioned here may include a type acquisition script used to acquire a system type of the terminal and at least one link address of a download page of a specified application program corresponding to the system type of the terminal.

Generally, the webpage content of the set webpage in the wireless network device may include a running script Javascript, a display frame HTML, and an element display mode CSS.

After receiving the specified webpage address sent by the wireless network device, the terminal sends, to the wireless network device, the webpage content acquisition request used to acquire the webpage content of the set webpage corresponding to the specified webpage address.

In practical application, the terminal may send an Http request carrying the foregoing specified webpage address to the wireless network device, so as to acquire the webpage content of the webpage corresponding to the specified webpage address.

Figure 4C:
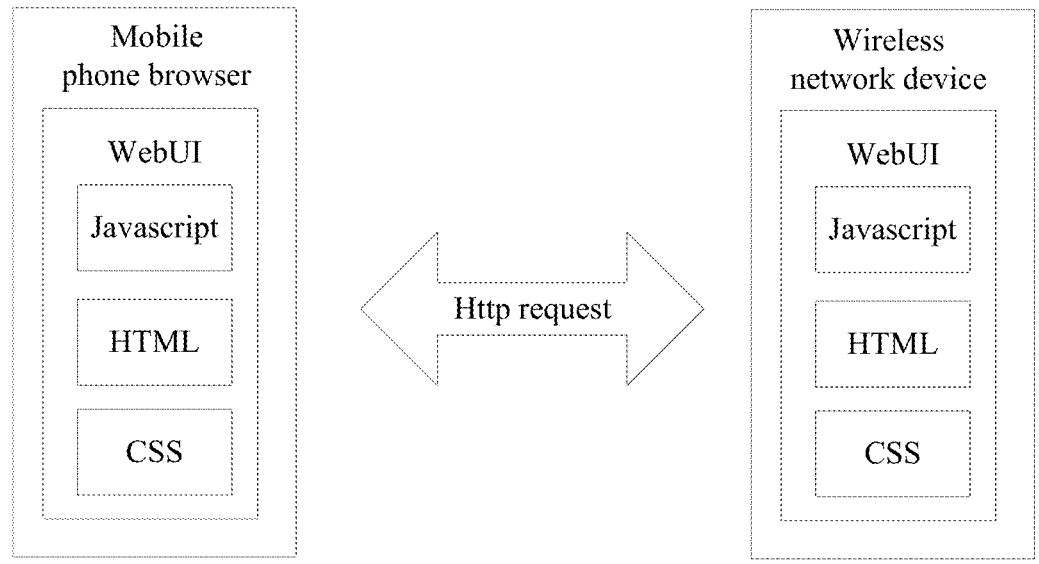
FIG. 4C is a schematic diagram of acquiring a webpage address of a set webpage by a terminal by using an Http request according to an embodiment of the present invention.

Referring to FIG. 4C, FIG. 4C shows a schematic diagram of acquiring a webpage address of a set webpage by a terminal by using an Http request according to an embodiment of the present invention. The set webpage WebUI in the wireless network device includes the Javascript, the HTML, and the CSS, and the terminal sends the Http request including the WebUI to the wireless network device.

407. The wireless network device receives the webpage content acquisition request sent by the terminal.

408. The wireless network device sends the webpage content of the set webpage to the terminal.

The webpage content includes the type acquisition script used to acquire the system type of the terminal.

409. The terminal receives the webpage content sent by wireless network device.

Still, referring to FIG. 4C, when receiving the Http request that is sent by the terminal and is used to acquire the WebUI in the wireless network device, the wireless network device sends all content of the WebUI to the terminal. Accordingly, the terminal receives all the content of the WebUI.

410. The terminal acquires a system type of the terminal according to a type acquisition script in the webpage content.

That the terminal acquires a system type of the terminal according to a type acquisition script in the webpage content may include: executing the type acquisition script in the webpage content; and calling, by using the type acquisition script, an interface that is in a browser and is used to acquire the system type of the terminal, so as to acquire the system type of the terminal.

411. The terminal sends the system type to the wireless network device.

412. The wireless network device receives the system type.

413. The wireless network device sends, to the terminal, a push address that is provided for the terminal to download an application program and is corresponding to the system type.

In practical application, the wireless network device may push one, two, or multiple specified application programs to the terminal. When the wireless network device pushes one specified application program to the terminal, after acquiring the system type of the terminal, the wireless network device sends, to the terminal, a push address that is required when the terminal downloads the application program and that is corresponding to the system type. Accordingly, a browser in the terminal may directly jump to a download page of the specified application program corresponding to the system type.

When two or more application programs are to be pushed by the wireless network device to the terminal, the wireless network device sends, to the terminal, a webpage address of a recommended webpage corresponding to the system type, where the recommended webpage includes download addresses of all to-be-pushed application programs. Accordingly, the running script in the terminal may execute the following steps:

First, display a shortcut navigation option of a download page of a specified application program corresponding to the system type.

The shortcut navigation option mentioned here is corresponding to a link address of the download page. For example, the shortcut navigation option may be an application program icon set in a page of a webpage in a browser. The application program icon is correlated with a link address of a corresponding download page, for example, a shortcut navigation option shown in FIG. 3B. For another example, the shortcut navigation option may further be a link address set in a page of a webpage in a browser. The link address is a webpage address of the download page of the application program, for example, a shortcut navigation option shown in FIG. 3C.

Generally, before displaying the shortcut navigation option of the download page of the specified application program corresponding to the system type, the running script sends a loading request to the wireless network device. After receiving the loading request, to ensure that some application programs that have been installed in the terminal are pushed again, the wireless network device checks whether a notification message that is sent by the terminal and is used to indicate that the terminal has installed a specified application program is received. If a check result is that the notification message that is sent by the terminal and is used to indicate that the terminal has installed the specified application program is received, the wireless network device sends, to the terminal, an instruction of not loading a download address of the specified application program, and the browser in the terminal displays a page of a recommended webpage that includes download addresses of all other to-be-pushed application programs than the specified application program.

Second, receive a determining request that is generated when one shortcut navigation option thereof is selected.

When the user selects one shortcut navigation option thereof, accordingly, the terminal may receive the determining request that is generated when the user selects the shortcut navigation option.

Third, display a download page corresponding to the shortcut navigation option corresponding to the determining request.

After receiving the determining request, the terminal displays the download page corresponding to the shortcut navigation option corresponding to the determining request, that is, a browser in the terminal jumps to the download page corresponding to the shortcut navigation option corresponding to the determining request.

For example, when an existing mobile phone terminal sets a function of the wireless network device, the mobile phone terminal generally logs in to the WebUI inside the wireless network device to perform setting. Because an operation on the WebUI is performed in the mobile phone terminal by using a webpage, the webpage responds in a relatively low speed. However, an application program installed in the mobile phone terminal is processed faster than that in the webpage. Therefore, an application program that can be installed in the mobile phone terminal and is used to control the wireless network device may be developed. However, many users of mobile phone terminals generally do not know the newly developed application program that may be used to control the wireless network device. Therefore, the developed application program needs to be actively pushed to the terminal. In this case, the wireless network device may push, according to this embodiment of the present invention, the application program to the terminal connected to the wireless network device. In this way, the users can quickly set the wireless network device according to the application program.

It should be additionally explained that in practical application push, if there is a new specified application program that needs to be pushed by using the wireless network device, the wireless network device may be upgraded, that is, a script used to push the specified application program is added to the running script of the webpage content of the set webpage in the wireless network device. Apparently, because when the specified application program is pushed to the terminal, information such as the shortcut navigation option corresponding to the specified application program needs to be displayed, the HTML and the CSS need to be accordingly modified in the webpage content of the set webpage, so that the terminal displays the information such as the shortcut navigation option corresponding to the specified application program.

In conclusion, according to the method for pushing an application program in this embodiment of the present invention, a wireless network device sends webpage content of a set webpage in the wireless network device to a terminal, so as to acquire a system type of the terminal, and a push address that is of an application program and is corresponding to the system type is pushed to the terminal, which resolves a problem in the prior art that a user is likely to miss a best opportunity to obtain a new application program. When a specified application program is developed and needs to be pushed, multiple download addresses that are of the application program and are corresponding to all system types may be added to the wireless network device, and when the system type of the terminal is acquired according to the webpage content, a download address that is of the application program and is corresponding to the system type of the terminal is pushed to the terminal, which implements a function of actively pushing the specified application program to the terminal, and achieves an effect of ensuring that the user can grasp the best opportunity to obtain the new application program.

The following are apparatus embodiments of the present invention. For details not described in detail, refer to the foregoing corresponding method embodiments.

Figure 5:
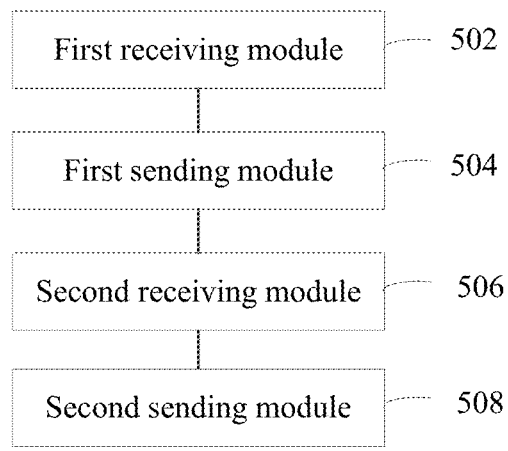
FIG. 5 is a schematic structural diagram of an apparatus for pushing an application program according to an embodiment of the present invention.

Referring to FIG. 5, FIG. 5 shows a schematic structural diagram of an apparatus for pushing an application program according to still another embodiment of the present invention. In this embodiment, that the apparatus for pushing an application program is applied to the wireless network device 120 in FIG. 1 is used as an example for description. The apparatus for pushing an application program may include but is not limited to: a first receiving module 502, a first sending module 504, a second receiving module 506, and a second sending module 508.

The first receiving module 502 may be configured to control a receiver to receive a connection request for establishing a connection to the wireless network device that is sent by a terminal;

the first sending module 504 may be configured to: control a transmitter to send a specified webpage address to the terminal, and the terminal acquires a system type of the terminal according to webpage content corresponding to the received specified webpage address and sends the system type to the wireless network device;

the second receiving module 506 may be configured to control the receiver to receive the system type sent by the terminal; and the second sending module 508 may be configured to control the transmitter to send, to the terminal, a push address that is provided for the terminal to download an application program and is corresponding to the system type.

In conclusion, according to the apparatus for pushing an application program in this embodiment of the present invention, a wireless network device sends webpage content of a set webpage in the wireless network device to a terminal, so as to acquire a system type of the terminal, and a push address that is of an application program and is corresponding to the system type is pushed to the terminal, which resolves a problem in the prior art that a user is likely to miss a best opportunity to obtain a new application program. When a specified application program is developed and needs to be pushed, multiple download addresses that are of the application program and are corresponding to all system types may be added to the wireless network device, and when the system type of the terminal is acquired according to the webpage content, a download address that is of the application program and is corresponding to the system type of the terminal is pushed to the terminal, which implements a function of actively pushing the specified application program to the terminal, and achieves an effect of ensuring that the user can grasp the best opportunity to obtain the new application program.

Figure 6:
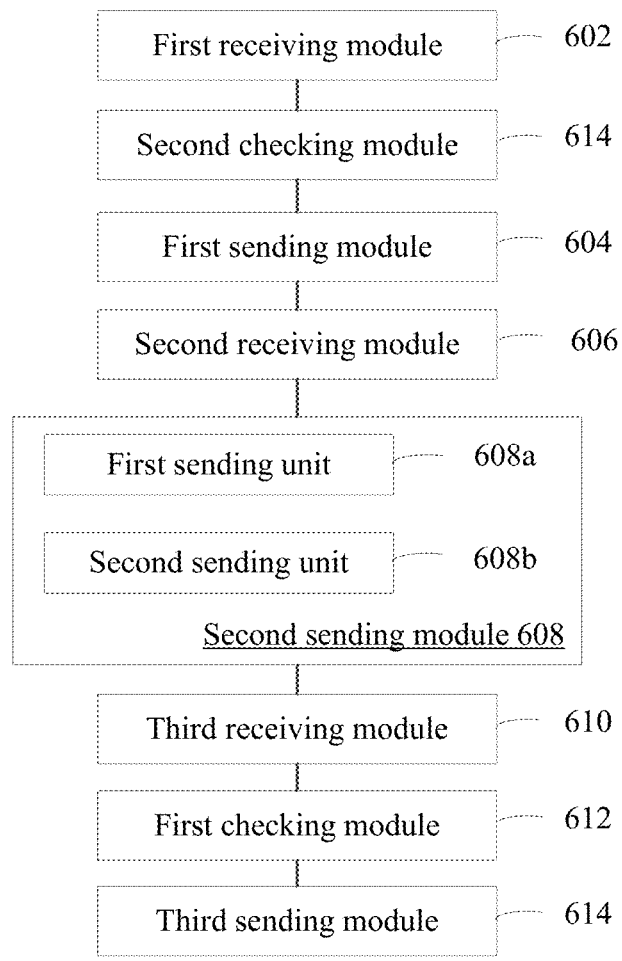
FIG. 6 is a schematic structural diagram of an apparatus for pushing an application program according to another embodiment of the present invention.

Referring to FIG. 6, FIG. 6 shows a schematic structural diagram of an apparatus for pushing an application program according to still another embodiment of the present invention. In this embodiment, that the apparatus for pushing an application program is applied to the wireless network device 120 in FIG. 1 is used as an example for description. The apparatus for pushing an application program may include but is not limited to: a first receiving module 602, a first sending module 604, a second receiving module 606, and a second sending module 608.

The first receiving module 602 may be configured to control a receiver to receive a connection request for establishing a connection to the wireless network device that is sent by a terminal;

the first sending module 604 may be configured to: control a transmitter to send a specified webpage address to the terminal, and the terminal acquires a system type of the terminal according to webpage content corresponding to the received specified webpage address and sends the system type to the wireless network device;

the second receiving module 606 may be configured to control the receiver to receive the system type sent by the terminal; and the second sending module 608 may be configured to control the transmitter to send, to the terminal, a push address that is provided for the terminal to download an application program and is corresponding to the system type.

In a first possible implementation manner of this embodiment, the second sending module 608 includes: a first sending unit 608*a* and a second sending unit 608*b*.

The first sending unit 608*a* may be configured to: when one application program is to be pushed, control the transmitter to send, to the terminal, a download address that is required when the terminal downloads the application program and that is corresponding to the system type; and the second sending unit 608*b* may be configured to: when two or more application programs are to be pushed, control the transmitter to send, to the terminal, a webpage address of a recommended webpage corresponding to the system type, where the recommended webpage includes download addresses of all to-be-pushed application programs.

In a second possible implementation manner of this embodiment, the apparatus for pushing an application program may further include: a third receiving module 610, a first checking module 612, and a third sending module 614.

The third receiving module 610 is configured to control the receiver to receive a loading request that is sent when the terminal loads content of the recommended webpage;

the first checking module 612 is configured to control a processor to check whether a notification message that is sent by the terminal and is used to indicate that the terminal has installed a specified application program is received; and the third sending module 614 is configured to: when a check result of the first checking module 612 is that the notification message that is sent by the terminal and is used to indicate that the terminal has installed the specified application program is received, control the transmitter to send, to the terminal, an instruction of not loading a download address of the specified application program, and the terminal displays a page of a recommended webpage that includes download addresses of all other to-be-pushed application programs than the specified application program.

In a third possible implementation manner of this embodiment, the apparatus for pushing an application program may further include a second checking module 616.

The second checking module 616 may be configured to control the processor to check whether the wireless network device stores a refuse instruction that is sent by the terminal and is used to indicate that the terminal refuses to receive an application program pushed by the wireless network device; where the first sending module 604 may further be configured to: when a check result of the second checking module 616 is that the wireless network device does not store the refuse instruction that is sent by the terminal and is used to indicate that the terminal refuses to receive the application program pushed by the wireless network device, control the transmitter to send the specified webpage address to the terminal.

In conclusion, according to the apparatus for pushing an application program in this embodiment of the present invention, a wireless network device sends webpage content of a set webpage in the wireless network device to a terminal, so as to acquire a system type of the terminal, and a push address that is of an application program and is corresponding to the system type is pushed to the terminal, which resolves a problem in the prior art that a user is likely to miss a best opportunity to obtain a new application program. When a specified application program is developed and needs to be pushed, multiple download addresses that are of the application program and are corresponding to all system types may be added to the wireless network device, and when the system type of the terminal is acquired according to the webpage content, a download address that is of the application program and is corresponding to the system type of the terminal is pushed to the terminal, which implements a function of actively pushing the specified application program to the terminal, and achieves an effect of ensuring that the user can grasp the best opportunity to obtain the new application program.

It should be noted that, when the apparatus for pushing an application program provided in the foregoing embodiment pushes the application program, description is given only by using division of the foregoing functional modules. In practical application, functions may be allocated to different functional modules for implementation as required. That is, an internal structure of the wireless network device is divided into different functional modules to implement all or part of the functions described in the foregoing. In addition, the apparatus for pushing an application program provided in the foregoing embodiments pertains to a same concept as that of the embodiments of the method for pushing an application program, and reference may be made to the method embodiments for a specific implementation process of the apparatus for pushing an application program, which is not described herein again.

Figure 7:
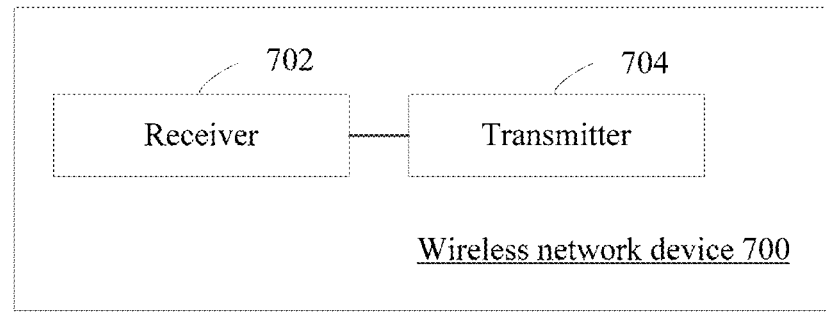
FIG. 7 is a schematic structural diagram of a wireless network device according to an embodiment of the present invention.

Referring to FIG. 7, FIG. 7 shows a schematic structural diagram of a wireless network device according to an embodiment of the present invention, where the wireless network device 700 may be the wireless network device 120 in FIG. 1. The wireless network device 700 may include but is not limited to: a receiver 702 and a transmitter 704.

The receiver 702 may be configured to receive a connection request for establishing a connection to the wireless network device that is sent by a terminal;

the transmitter 704 may be configured to send a specified webpage address to the terminal, and the terminal acquires a system type of the terminal according to webpage content corresponding to the received specified webpage address and sends the system type to the wireless network device;

the receiver 702 may be further configured to receive the system type sent by the terminal; and the transmitter 704 may be further configured to send, to the terminal, a push address that is provided for the terminal to download an application program and is corresponding to the system type.

In conclusion, according to the wireless network device provided in this embodiment of the present invention, a wireless network device sends webpage content of a set webpage in the wireless network device to a terminal, so as to acquire a system type of the terminal, and a push address that is of an application program and is corresponding to the system type is pushed to the terminal, which resolves a problem in the prior art that a user is likely to miss a best opportunity to obtain a new application program. When a specified application program is developed and needs to be pushed, multiple download addresses that are of the application program and are corresponding to all system types may be added to the wireless network device, and when the system type of the terminal is acquired according to the webpage content, a download address that is of the application program and is corresponding to the system type of the terminal is pushed to the terminal, which implements a function of actively pushing the specified application program to the terminal, and achieves an effect of ensuring that the user can grasp the best opportunity to obtain the new application program.

Figure 8:
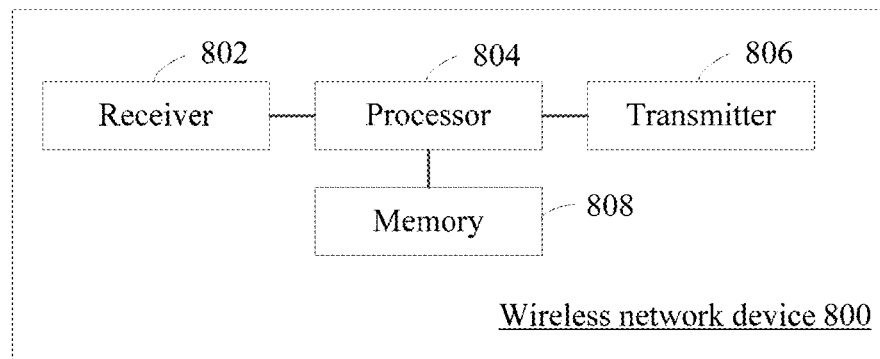
FIG. 8 is a schematic structural diagram of a wireless network device according to another embodiment of the present invention.

Referring to FIG. 8, FIG. 8 shows a schematic structural diagram of a wireless network device according to another embodiment of the present invention, where the wireless network device 800 may be the wireless network device 120 in FIG. 1. The wireless network device 800 may include but is not limited: a receiver 802, a processor 804, a transmitter 806, and a memory 808, where the processor 804 is coupled to the receiver 802, the transmitter 806, and the memory 808 respectively. The memory 808 stores at least one type of computer software, and the processor 804 may execute a related operation according to this type of computer software.

The receiver 802 may be configured to receive a connection request for establishing a connection to the wireless network device that is sent by a terminal;

the transmitter 806 may be configured to send a specified webpage address to the terminal, and the terminal acquires a system type of the terminal according to webpage content corresponding to the received specified webpage address and sends the system type to the wireless network device;

the receiver 802 may be further configured to receive the system type sent by the terminal; and the transmitter 806 may be further configured to send, to the terminal, a push address that is provided for the terminal to download an application program and is corresponding to the system type.

In a first possible implementation manner of this embodiment, the processor 806 may be configured to: when one application program is to be pushed, send, to the terminal, a download address that is required when the terminal downloads the application program and that is corresponding to the system type; and the transmitter 806 may be configured to: when two or more application programs are to be pushed, send, to the terminal, a webpage address of a recommended webpage corresponding to the system type, where the recommended webpage includes download addresses of all to-be-pushed application programs.

In a second possible implementation manner of this embodiment, the receiver 802 may be configured to receive a loading request that is sent when the terminal loads content of the recommended webpage;

the processor 804 may be configured to check whether a notification message that is sent by the terminal and is used to indicate that the terminal has installed a specified application program is received; and the transmitter 806 may be configured to: when a check result of the processor 804 is that the notification message that is sent by the terminal and is used to indicate that the terminal has installed the specified application program is received, send, to the terminal, an instruction of not loading a download address of the specified application program, and the terminal displays a page of a recommended webpage that includes download addresses of all other to-be-pushed application programs than the specified application program.

In a third possible implementation manner of this embodiment, the processor 804 may check whether the wireless network device stores a refuse instruction that is sent by the terminal and is used to indicate that the terminal refuses to receive the application program pushed by the wireless network device; and the transmitter 806 may further be configured to: when a check result of the processor 804 is that the wireless network device does not store the refuse instruction that is sent by the terminal and is used to indicate that the terminal refuses to receive the application program pushed by the wireless network device, control the transmitter to send the specified webpage address to the terminal.

In conclusion, according to the wireless network device provided in this embodiment of the present invention, a wireless network device sends webpage content of a set webpage in the wireless network device to a terminal, so as to acquire a system type of the terminal, and a push address that is of an application program and is corresponding to the system type is pushed to the terminal, which resolves a problem in the prior art that a user is likely to miss a best opportunity to obtain a new application program. When a specified application program is developed and needs to be pushed, multiple download addresses that are of the application program and are corresponding to all system types may be added to the wireless network device, and when the system type of the terminal is acquired according to the webpage content, a download address that is of the application program and is corresponding to the system type of the terminal is pushed to the terminal, which implements a function of actively pushing the specified application program to the terminal, and achieves an effect of ensuring that the user can grasp the best opportunity to obtain the new application program.

Figure 9:
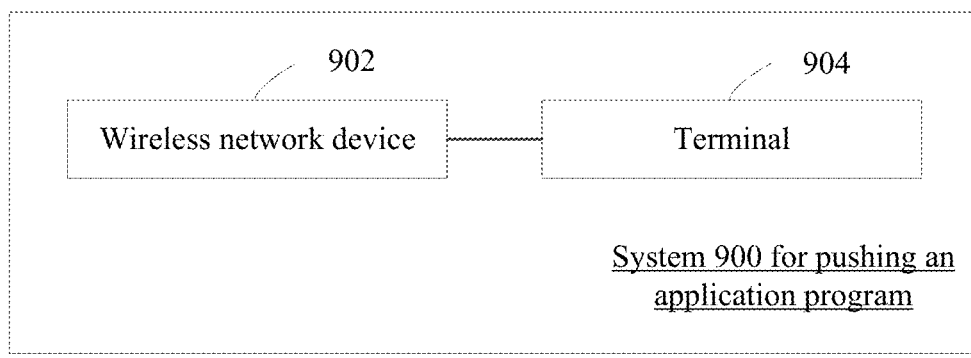
FIG. 9 is a schematic diagram of a system for pushing an application program according to an embodiment of the present invention.

Referring to FIG. 9, FIG. 9 shows a schematic structural diagram of a system for pushing an application program according to an embodiment of the present invention, where the system 900 for pushing an application program may include a wireless network device 902 and at least one terminal 904, where the wireless network device 902 is connected to the terminal 904 by using a wired network or by using a wireless network.

The wireless network device 902 may be the apparatus for pushing an application program described in FIG. 5 or FIG. 6, or may be the wireless network device shown in FIG. 7 or FIG. 8.

In conclusion, according to the system for pushing an application program provided in this embodiment of the present invention, when a push condition is met, a wireless network device sends webpage content of a set webpage in the wireless network device to a terminal, and the terminal acquires a system type of the terminal according to the webpage content and displays a download page that is corresponding to the system type and is of a specified application program, which resolves a problem in the prior art that a user is likely to miss a best opportunity to obtain a new application program. When a specified application program is developed and needs to be pushed, a download page of the to-be-pushed specified application program may be added to the webpage content of the set webpage in the wireless network device, and when the system type of the terminal is acquired according to the webpage content, a link address of the download page that is corresponding to the system type and is of the specified application program may be displayed, which implements a function of actively pushing the specified application program to the terminal, and achieves an effect of ensuring that the user can grasp the best opportunity to obtain the new application program.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division may merely be logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An electronic device, comprising:
a processor;
a memory coupled to the processor; and
a program stored in the memory which, when executed by the processor, causes the electronic device to:
receive, by a browser application, webpage content corresponding to a webpage address and comprising a script for acquiring a system type of the electronic device, wherein the webpage content includes a first download address for downloading a first installation package of an application and a second download address for downloading a second installation package of the application, wherein the first download address corresponds to a first system type, wherein the second download address corresponds to a second system type, wherein the first installation package is different from the second installation package, and wherein the first system type is different from the second system type;
load, by the browser application, the script to acquire the system type of the electronic device;
acquire, in response to loading the script, the first system type of the electronic device;
jump, by the browser application, to the first download address to download the application in response to the first system type of the electronic device being acquired; and
display, by the browser application, a download page corresponding to the first installation package of the application, compatible with the first system type, in response to the browser application jumping to the first download address.

2. The electronic device of claim 1, wherein the script is a JAVASCRIPT.

3. The electronic device of claim 2, wherein the program, when executed by the processor, causes the electronic device to provide an interface in the browser application to acquire the system type.

4. The electronic device of claim 3, wherein the program, when executed by the processor, causes the electronic device to:
determine that the application is already installed in the electronic device after the application has been downloaded; and
cause a notification message indicating that the application has already been installed to be displayed.

5. The electronic device of claim 1, wherein the script is preset in the webpage content.

6. The electronic device of claim 1, wherein the program, when executed by the processor, causes the electronic device to display a download webpage corresponding to the first download address, and wherein the download webpage comprises an icon and a description of the application.

7. The electronic device of claim 1, wherein the first installation package is available in an application store.

8. The electronic device of claim 7, wherein a provider of the application store is same as a provider of the first system type.

9. The electronic device of claim 1, wherein the application is an entertaining application.

10. A method performed by an electronic device, comprising:
receiving webpage content corresponding to a webpage address and comprising a script for acquiring a system type of the electronic device, wherein the webpage content includes a first download address for downloading a first installation package of an application and a second download address for downloading a second installation package of the application, wherein the first download address corresponds to a first system type, wherein the second download address corresponds to a second system type, wherein the first installation package is different from the second installation package, and wherein the first system type is different from the second system type;

loading the script to acquire the system type of the electronic device;

acquiring, in response to loading the script, the first system type of the electronic device;

jumping to the first download address to download the application in response to acquiring first system type of the electronic device; and displaying, by the browser application, a download page corresponding to the first installation package of the application, compatible with the first system type, in response to the browser application jumping to the first download address.

11. The method of claim 10, wherein the script is a JAVASCRIPT.

12. The method of claim 11, further comprising providing an interface in a browser application to acquire the system type.

13. The method of claim 12, further comprising:

determining that the application is already installed in the electronic device after downloading the application; and causing a notification message indicating that the application has already been installed to be displayed.

14. The method of claim 10, further comprising displaying a download webpage corresponding to the first download address, wherein the download webpage comprises an icon and a description of the application.

15. The method of claim 10, wherein the first installation package is available in an application store.

16. The method of claim 15, wherein a provider of the application store is same as a provider of the first system type.

17. The method of claim 10, wherein the application is an entertaining application.

18. A non-transitory computer readable storage medium storing one or more programs comprising instructions which, when executed by an electronic device with a touch-sensitive display, cause the electronic device to:

receive webpage content corresponding to a webpage address script for acquiring a system type of the electronic device, wherein the webpage content includes a first download address for downloading a first installation package of an application and a second download address for downloading a second installation package of the application, wherein the first download address corresponds to a first system type, wherein the second download address corresponds to a second system type, wherein the first installation package is different from the second installation package, and wherein the first system type is different from the second system type;

load the script to acquire the system type of the electronic device;

acquire, in response to loading the script, the first system type of the electronic device;

jump, by the browser application, to the first download address to download the application in response to the first system type of the electronic device being acquired; and display, by the browser application, a download page corresponding to the first installation package of the application, compatible with the first system type, in response to the browser application jumping to the first download address.

19. The non-transitory computer readable storage medium of claim 18, wherein the script is a JAVASCRIPT.

20. The non-transitory computer readable storage medium of claim 18, wherein the instructions cause the electronic device to provide an interface in the browser application to acquire the system type.

* * * * *